US012542758B1

(12) United States Patent
K et al.

(10) Patent No.: US 12,542,758 B1
(45) Date of Patent: Feb. 3, 2026

(54) OPTIMIZED DYNAMIC HOST CONFIGURATION PROTOCOL COMMUNICATION FOR AN OPTICAL LINE TERMINAL DEVICE

(71) Applicant: Juniper Networks, Inc., Sunnyvale, CA (US)

(72) Inventors: Kiran Kumar K, Bangalore (IN); Jayadev H R, Bangalore (IN); Subramanya Sharma P K, Bangalore (IN); Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 218 days.

(21) Appl. No.: 18/457,780

(22) Filed: Aug. 29, 2023

(51) Int. Cl.
*H04L 61/5014* (2022.01)
*H04B 10/27* (2013.01)

(52) U.S. Cl.
CPC ......... *H04L 61/5014* (2022.05); *H04B 10/27* (2013.01)

(58) Field of Classification Search
CPC ............................ H04L 61/5014; H04B 10/27
USPC ........................................................ 709/229
See application file for complete search history.

(56) References Cited

U.S. PATENT DOCUMENTS

| | | | | |
|---|---|---|---|---|
| 8,832,238 | B2 * | 9/2014 | Gaitonde | H04L 61/5014 709/221 |
| 9,331,914 | B2 * | 5/2016 | Thyni | H04L 47/724 |
| 2005/0025165 | A1 * | 2/2005 | Lee | H04L 61/5014 370/392 |
| 2005/0243837 | A1 * | 11/2005 | Boyd | H04L 45/00 370/395.52 |
| 2008/0298809 | A1 * | 12/2008 | Zheng | H04L 12/467 398/118 |
| 2020/0120408 | A1 * | 4/2020 | Boyd | H04L 41/0886 |
| 2022/0417625 | A1 * | 12/2022 | Abe | H04L 45/02 |

FOREIGN PATENT DOCUMENTS

WO   WO-2021199249 A1 * 10/2021 ........... H04B 10/272

\* cited by examiner

*Primary Examiner* — Anthony Mejia
(74) *Attorney, Agent, or Firm* — Harrity & Harrity, LLP (57) ABSTRACT

In some implementations, an optical line terminal (OLT) device may identify one or more client devices that are connected to the OLT device via one or more communication links. The OLT device may determine, based on identifying the one or more client devices, one or more identifiers associated with the one or more client devices. The OLT device may communicate, based on determining the one or more identifiers associated with the one or more client devices, with a dynamic host configuration protocol (DHCP) relay device to obtain one or more Internet protocol (IP) addresses associated with the one or more client devices.

20 Claims, 8 Drawing Sheets

OPTIMIZED DYNAMIC HOST CONFIGURATION PROTOCOL COMMUNICATION FOR AN OPTICAL LINE TERMINAL DEVICE

BACKGROUND

The dynamic host configuration protocol (DHCP) is a network management protocol used on Internet protocol (IP) networks for assigning IP addresses and other communication parameters to devices connected to the network using a client-server architecture. A DHCP server is a network server that automatically provides and assigns IP addresses, default gateways, and other network parameters to client devices. In some cases, a DHCP relay sits between a client device and the DHCP server to facilitate communication between the client device and the DHCP server.

SUMMARY

In some implementations, a method includes identifying, by an optical line terminal (OLT) device, one or more client devices that are connected to the OLT device via one or more communication links; determining, by the OLT device and based on identifying the one or more client devices, one or more identifiers associated with the one or more client devices; and communicating, by the OLT device and based on determining the one or more identifiers associated with the one or more client devices, with a DHCP relay device to obtain one or more IP addresses associated with the one or more client devices.

In some implementations, a non-transitory computer-readable medium storing a set of instructions includes one or more instructions that, when executed by one or more processors of an OLT device, cause the OLT device to: identify one or more client devices that are connected to the OLT device; determine, based on identifying the one or more client devices, one or more identifiers associated with the one or more client devices; and communicate, based on the one or more identifiers, with a DHCP device to obtain one or more IP addresses associated with the one or more client devices.

In some implementations, an OLT device includes one or more memories, and one or more processors to: identify a client device that is connected to the OLT device; determine an identifier associated with the client device; and communicate, based on the identifier, with a DHCP device to obtain an IP address associated with the client device.

DETAILED DESCRIPTION

The following detailed description of example implementations refers to the accompanying drawings. The same reference numbers in different drawings may identify the same or similar elements.

An OLT device provides access to a network for client devices connected to the OLT device. In many cases, the OLT device can act as a lightweight DHCP relay agent (LDRA) for the client devices. This allows the client devices to communicate DHCP messages with a DHCP server of the network to obtain IP addresses, such as when the client devices boot up or become available to access the network.

In some cases, an unexpected event, such as a power cycling event, causes the client devices to boot up contemporaneously (e.g., in a same time window after the unexpected event). This causes a flood of DHCP messaging to be communicated between the client devices and the DHCP server via the OLT device, which consumes substantial computing resources (e.g., processing resources, memory resources, communication resources, and/or power resources, among other examples) of the OLT device and the DHCP server, as well any other DHCP relays between the OLT device and the DHCP server, and therefore impacts a performance (e.g., a control plane performance) of these devices (e.g., in terms of latency, throughput, or other metrics). This can also increase an amount of time that is needed for a client device to obtain an IP address and access the network, which impacts a functionality of the client device.

Some implementations described herein include an OLT device (e.g., that is configured as an LDRA) that is connected to one or more client devices via one or more communication links (e.g., connected to the one or more client devices via one or more respective communication links). The OLT device identifies the one or more client devices (e.g., as connected to the OLT device) and determines one or more identifiers associated with the one or more client devices (e.g., one or more respective identifiers for the one or more client devices). Each identifier associated with a client device, for example, may be a circuit identifier associated with a communication link that connects the client device to the OLT device.

The OLT device then communicates with a DHCP device (e.g., a DHCP relay device or a DHCP server device), using the one or more identifiers, to obtain one or more IP addresses for the one or more client devices (e.g., one or more respective IP addresses for the one or more client devices). For example, for a particular client device, the OLT device may generate a DHCP message that includes a particular identifier that is associated with the client device (e.g., a particular circuit identifier associated with a particular communication link that connects the particular client device to the OLT device), may send the DHCP message to the DHCP device, and may receive, in response, another DHCP message that includes the particular identifier and a particular IP address. The OLT device may determine, based on the particular identifier included in the other DHCP message, that the particular IP address is for the particular client device. Accordingly, the OLT device may save the particular IP address (e.g., in a data structure) to allow the OLT device to provide the particular IP address to the particular client device at a later time.

In this way, the OLT device obtains one or more respective IP addresses for the one or more client devices (e.g., without communicating with the one or more client devices). Accordingly, the OLT device may communicate with the DHCP device in a manner such that a likelihood of flooding of DHCP messaging between the OLT device and the DHCP device is reduced. For example, the OLT device may individually obtain the one or more IP addresses (e.g., by only communicating with the DHCP device to obtain an IP address for a client device after obtaining an IP address for another client device), or may limit a number of IP addresses that the OLT device contemporaneously tries to obtain (e.g., less than a threshold number of IP addresses during a same time window). This reduces an amount of computing resources (e.g., processing resources, memory resources, communication resources, and/or power resources, among other examples) that would otherwise be needed to be consumed during any one time window by the OLT device and the DHCP device, and therefore improves a performance (e.g., a control plane performance) of the OLT device and the DHCP device (e.g., in terms of latency, throughput, or other metrics).

In some implementations, a client device communicates with the OLT device to obtain an IP address for the client device. Accordingly, because the OLT device already obtained and saved the IP address, the OLT device only needs to communicate with the client device to provide the IP address to the client device. This further reduces an amount of computing resources that would otherwise be needed to be consumed by the OLT device (e.g., to relay DHCP messaging to and from a DHCP server), and decreases an amount of time that is needed for the client device to obtain the IP address (e.g., because the OLT device can directly provide the IP address to the client device without communicating with any other device). This therefore also improves a functionality of the client device (e.g., because the client device is able to quickly obtain the IP address and access the network).

FIGS. 1A-1D are diagrams of one or more example implementations 100 described herein. Example implementation(s) 100 may include one or more client devices (shown as client devices 1 to N), an optical line terminal (OLT) device (e.g., that is configured as an LDRA) and/or one or more of a DHCP relay device, a DHCP server device, and/or an authentication device associated with a network (e.g., that is associated with a broadband network gateway (BNG)). Each device is described in more detail below in connection with FIGS. 2-4.

Figure 1A:
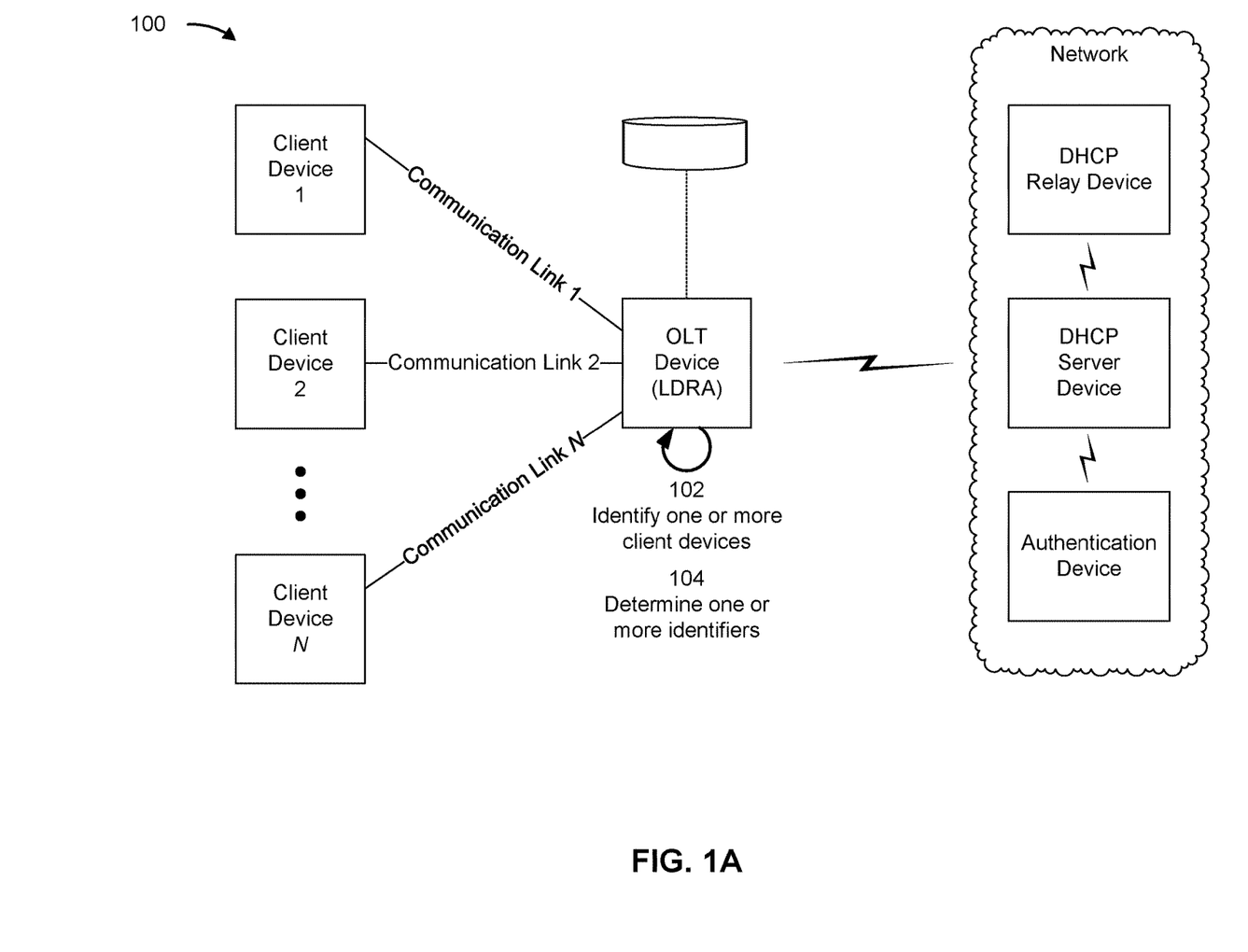
FIGS. 1A-1D are diagrams of one or more example implementations described herein.

As shown in FIG. 1A, the OLT device may be connected to the one or more client devices, such as via one or more communication links. For example, the OLT device may be connected to each client device, of the one or more client devices, via a particular communication link of the one or more communication links. That is, the OLT device may be connected to the one or more client devices via one or more respective communication links.

As shown in FIG. 1A, and by reference number 102, the OLT device may identify the one or more client devices. For example, the OLT device may identify and process (e.g., parse and/or read) configuration information to identify the one or more client devices. The configuration information may be stored in a data structure (e.g., a database, a table, a file, or another type of data structure) that is accessible to and/or included in the OLT device. As another example, the OLT device may perform a self-check process (e.g., a self-diagnostic process, or a similar process, such as on a bootup of the OLT device) to identify the one or more client devices (e.g., to identify that the OLT device is connected to the one or more client devices via the one or more communication links).

As shown by reference number 104, the OLT device may determine (e.g., based on identifying the one or more client devices) one or more identifiers that are associated with the one or more client devices (e.g., one or more respective identifiers for the one or more client devices). For example, a particular client device, of the one or more client devices, may be connected to the OLT device via a particular communication link of the one or more communication links. Moreover, the particular communication link may be associated with a particular identifier (e.g., of the one or more identifiers), and therefore the OLT device may determine that the particular identifier is associated with the particular client device (e.g., the particular identifier may be used to identify the particular client device). In some implementations, the particular identifier may be a circuit identifier, or another type of identifier, associated with the particular communication link.

Figure 1B:
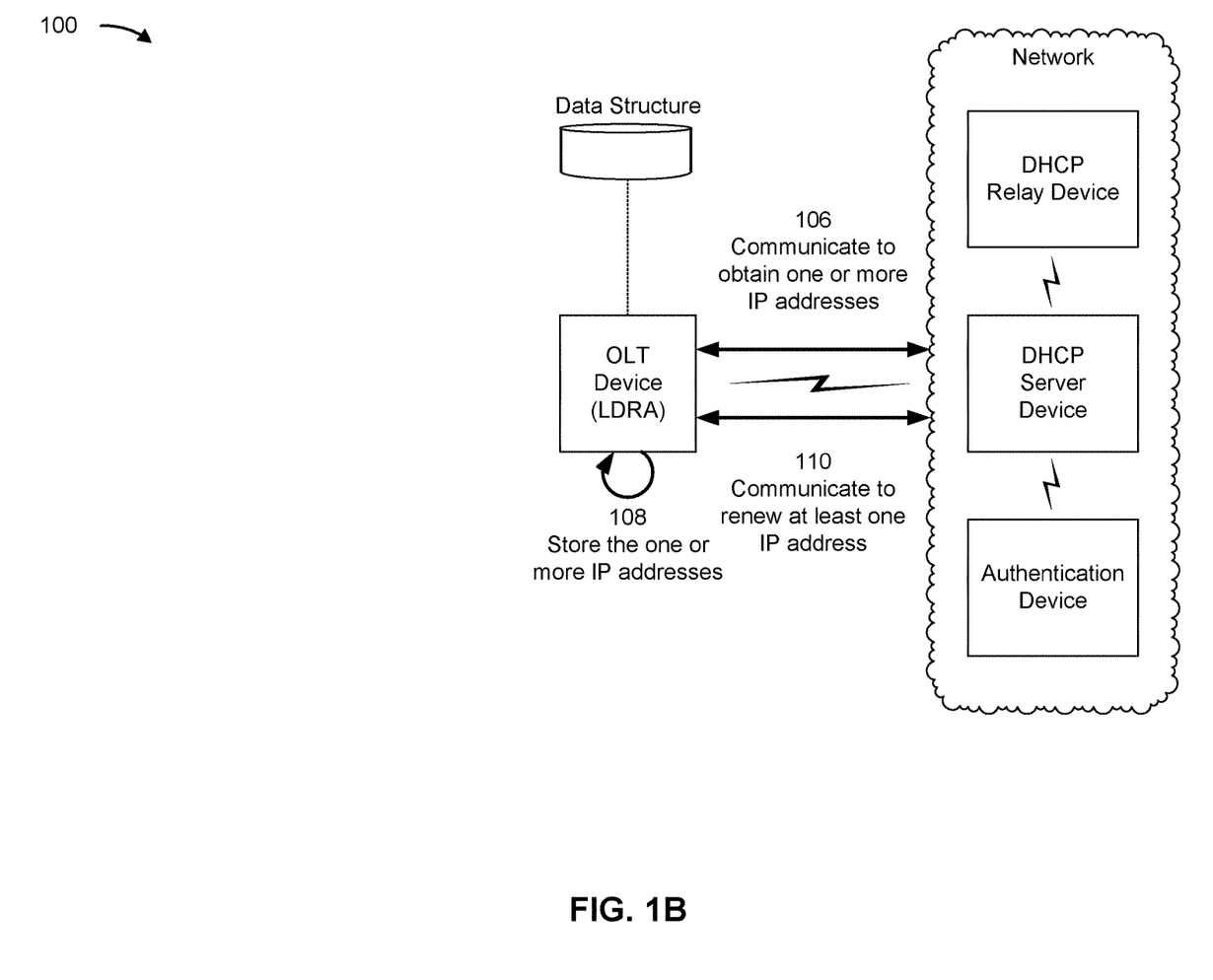

As shown in FIG. 1B, and by reference number 106, the OLT device may communicate (e.g., based on determining the one or more identifiers associated with the one or more client devices) with a DHCP device (e.g., the DHCP relay device or the DHCP server device). The OLT device may communicate with the DHCP device to obtain one or more IP addresses associated with the one or more client devices (e.g., one or more respective IP addresses for the one or more client devices). That is, the OLT device may communicate with the DHCP device to obtain an IP address for each client device, of the one or more client devices, that is connected to the OLT device via a corresponding communication link of the one or more communication links.

Each IP address may be an IPv4 address. The OLT device and the DHCP device (e.g., the DHCP relay device or the DHCP server device) may therefore communicate using DHCPv4 to allow the OLT device to obtain an IP address (e.g., for a client device of the one or more client devices). For example, for a client device, the OLT device may generate and send, to the DHCP device, a discover message requesting an IP address (e.g., an Ipv4 address that is to be obtained for the client device). The discover message may include an identifier, of the one or more identifiers, that is associated with the client device (e.g., may include a circuit identifier of a communication link that connects the client device to the OLT device). The DHCP device (or another device) then may communicate with the authentication device to allow the authentication device to authenticate the discover message (e.g., to authenticate, based on the identifier, the client device as authorized to be assigned an IP address). Based on the authentication device authenticating the discover message, and/or based on the discover message, the DHCP device may generate and send (or may only send, such as when the DHCP device is a DHCP relay device), to the OLT device, an offer message (e.g., that includes the identifier) that offers an IP address. The OLT device, based on the offer message, may generate and send, to the DHCP device, a request message (e.g., that includes the identifier) requesting the offered IP address (e.g., to be obtained for the client device). The DHCP device, based on the request message, may generate and send (or may only send, such as when the DHCP device is a DHCP relay device), to the OLT device, an acknowledgment message (e.g., that includes the identifier) indicating that the IP address is assigned (e.g., obtained for the client device).

In this way, such as by including an identifier corresponding with each client device being in the DHCPv4 messages, the OLT device and DHCP device may communicate to enable the OLT device to obtain respective IPv4 addresses for the one or more client devices, without the OLT device communicating with the one or more client devices. That is, the OLT device may obtain an IPv4 address for a client device regardless of whether the client device has requested use of the IPv4 address.

Alternatively, each IP address may be an IPv6 address. The OLT device and the DHCP device (e.g., the DHCP relay device or the DHCP server device) may therefore communicate using DHCPv6 to allow the OLT device to obtain an IP address (e.g., an IPv6 address for a client device of the one or more client devices). For example, for a client device, the OLT device may generate and send, to the DHCP device, a solicit message requesting an IP address (e.g., that is to be obtained for the client device). The solicit message may include an identifier, of the one or more identifiers, that is associated with the client device (e.g., may include a circuit identifier of a communication link that connects the client device to the OLT device). The DHCP device (or another device) then may communicate with the authentication device to allow the authentication device to authenticate the solicit message (e.g., to authenticate, based on the identifier, the client device as authorized to be assigned an IP address). Based on the authentication device authenticating the solicit message, and/or based on the solicit message, the DHCP device may generate and send (or may only send, such as when the DHCP device is a DHCP relay device), to the OLT device, an advertise message that offers an IP address. The OLT device, based on the advertise message, may generate and send, to the DHCP device, a request message requesting the offered IP address (e.g., to be obtained for the client device). The DHCP device, based on the request message, may generate and send (or may only send, such as when the DHCP device is a DHCP relay device), to the DHCP relay device, a reply message indicating that the IP address is assigned (e.g., obtained for the client device).

In this way, such as by including an identifier corresponding to each client device being in the DHCPv6 messages, the OLT device and DHCP device may communicate to enable the OLT device to obtain respective IPv6 addresses for the one or more client devices, without the OLT device communicating with the one or more client devices. That is, the OLT device may obtain an IPv6 address for a client device regardless of whether the client device has requested use of the IPv6 address.

As shown by reference number 108, the OLT device may store the one or more IP addresses (e.g., based on obtaining the one or more IP addresses by communicating with the DHCP device). For example, the OLT device may store the one or more IP addresses in a data structure (e.g., that is the same as, or different than, the data structure described above) that is accessible to and/or included in the OLT device. In some implementations, the OLT device may store the one or more IP addresses in association with the one or more identifiers associated with the one or more client devices. For example, for each IP address, the OLT device may cause the data structure to include an entry that includes the IP address and an identifier, of the one or more identifiers, that is associated with a client device, of the one or more client devices, for which the IP address was obtained. Accordingly, the data structure may include one or more entries, where each entry includes information that identifies a client device and the IP address obtained by the OLT device for the client device.

In some implementations, the OLT device may obtain each IP address for a lease period (e.g., that is defined by a lease length). For example, the DHCP device may provide the IP address to the OLT device for a lease period that begins at a time of obtainment of the IP address and that persists for the lease length.

Accordingly, as shown by reference number 110, the DHCP relay device may communicate with the DHCP device (e.g., after communicating with the DHCP device) to obtain the one or more IP addresses) to renew at least one IP address of the one or more IP addresses. For example, the OLT device may determine that the lease period for an IP address is about to expire, and therefore may communicate with the DHCP device to cause the IP address to be renewed. In some implementations, the OLT device may determine that the data structure includes the identifier associated with the client device (e.g., the data structure includes an entry that includes the identifier), and therefore that the DHCP relay device is to continue reserving the IP address (e.g., for the client device), such as by communicating with the DHCP device to renew the IP address.

When the IP address is an IPv4 address, the OLT device and the DHCP device may therefore communicate using DHCPv4 to renew the IP address. For example, the OLT device may generate and send, to the DHCP device, a request message requesting renewal of the IP address (e.g., to continue reserving the IP address for the client device); and the DHCP device, based on the request message, may cause the lease period for the IP address to be updated and may send, to the OLT device, an acknowledgment message that confirms renewal of the IP address. When the IP address is an IPv6 address, the OLT device and the DHCP device may therefore communicate using DHCPv6 to renew the IP address. For example, the OLT device may generate and send, to the DHCP device, a renew message requesting renewal of the IP address (e.g., to continue reserving the IP address for the client device), and the DHCP device, based on the renew message, may cause the lease period for the IP address to be updated and may send, to the OLT device, a reply message that confirms renewal of the IP address.

In this way, the OLT device may obtain an IP address, and may cause the IP address to be renewed, for a client device (e.g., reserve the IP address for the client device), without the OLT device communicating with the client device. That is, the OLT device may obtain and renew the IP address for the client device regardless of whether the client device has requested use of the IP address.

Figure 1C:
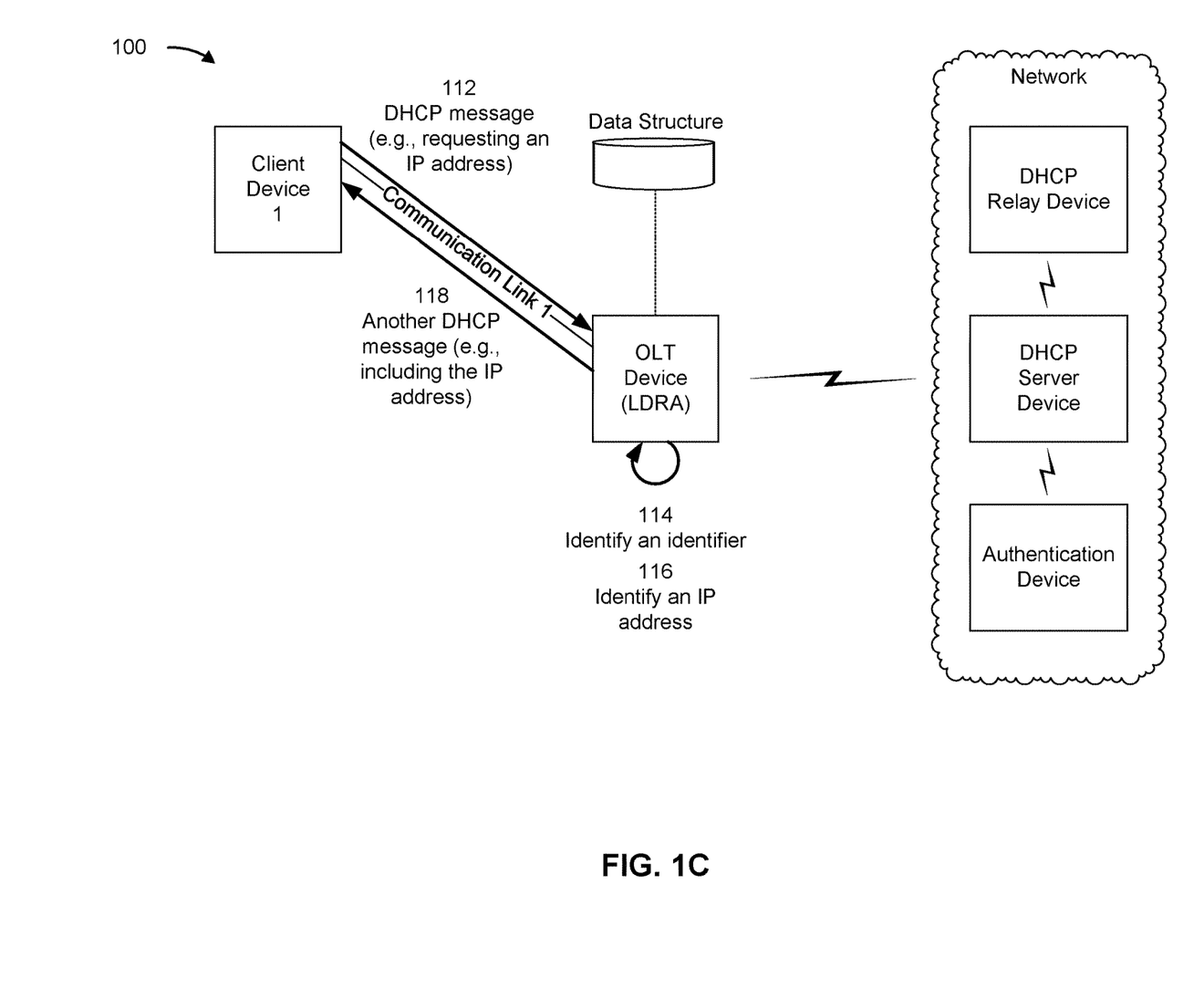

In some implementations, the OLT device may provide an IP address to a client device (e.g., an IP address that has been obtained for the client device). For example, the client device may request (e.g., via one or more messages) an IP address from the OLT device, such as upon the client device booting up or otherwise attempting to communicate with the network (e.g., that is associated with the DHCP relay device, the DHCP server device, and/or the authentication device). Accordingly, the OLT device may determine that the OLT device is to provide the IP address (e.g., the IP address the OLT device obtained for the client device) to the client device.

For example, as shown in FIG. 1C, the OLT device may communicate with a client device (shown as the client device 1) to provide (e.g., via one or more messages) the IP address to the client device. As shown by reference number 112, the client device may generate and send, via a communication link, a DHCP message (e.g., that is requesting an IP address for the client device) to the OLT device. As shown by reference number 114, the OLT device may identify (e.g., based on receiving the DHCP message) an identifier. For example, the OLT device may identify, based on receiving the DHCP message via the communication link, the identifier (e.g., the circuit identifier) that is associated with the communication link (and that, therefore, is also associated with the client device). As shown by reference number 116, the OLT device may identify an IP address, of the one or more IP addresses, that is associated with the client device (e.g., based on searching the data structure). For example, the OLT device may search, based on the identifier, the data structure for an entry, and may process (e.g., parse and/or read) the entry to identify the IP address associated with the client device. Accordingly, as shown by reference number 118, the OLT device may send, via the communication link, another DHCP message (e.g., that includes the IP address for the client device) to the client device.

In a specific example, when the IP address is an IPv4 address, the client device and the OLT device may communicate using DHCPv4 to provide the IP address to the client device (e.g., as shown in association with FIG. 1C). For example, the client device may generate and send, to the OLT device, a discover message requesting an IP address (e.g., that is to be utilized by the client device); the OLT device, based on the discover message, may generate and send, to the client device, an offer message that offers the IP address (e.g., the IP address obtained for the client device); the client device, based on the offer message, may generate and send, to the OLT device, a request message requesting the IP address; and the OLT device, based on the request message, may send, to the client device, an acknowledgment message indicating that the IP address is assigned to the client device. As another example, when the IP address is an IPv6 address, the client device and the OLT device may communicate using DHCPv6 to provide the IP address to the client device (e.g., as shown in association with FIG. 1C). For example, the client device may generate and send, to the OLT device, a solicit message requesting an IP address (e.g., that is to be utilized by the client device); the OLT device, based on the solicit message, may generate and send, to the client device, an advertise message that offers the IP address (e.g., the IP address obtained for the client device); the client device, based on the advertise message, may generate and send, to the OLT device, a request message requesting the IP address; and the OLT device, based on the request message, may generate and send, to the client device, a reply message indicating that the IP address is assigned to the client device.

In this way, the OLT device and client device may communicate to enable the client device obtaining an IP address (e.g., an IPv4 address or an IPv6 address) that the OLT device obtained for the client device. That is, the client device may obtain the IP address from the OLT device without the OLT device communicating with the DHCP device (e.g., the DHCP relay device or the DHCP server device).

Figure 1D:
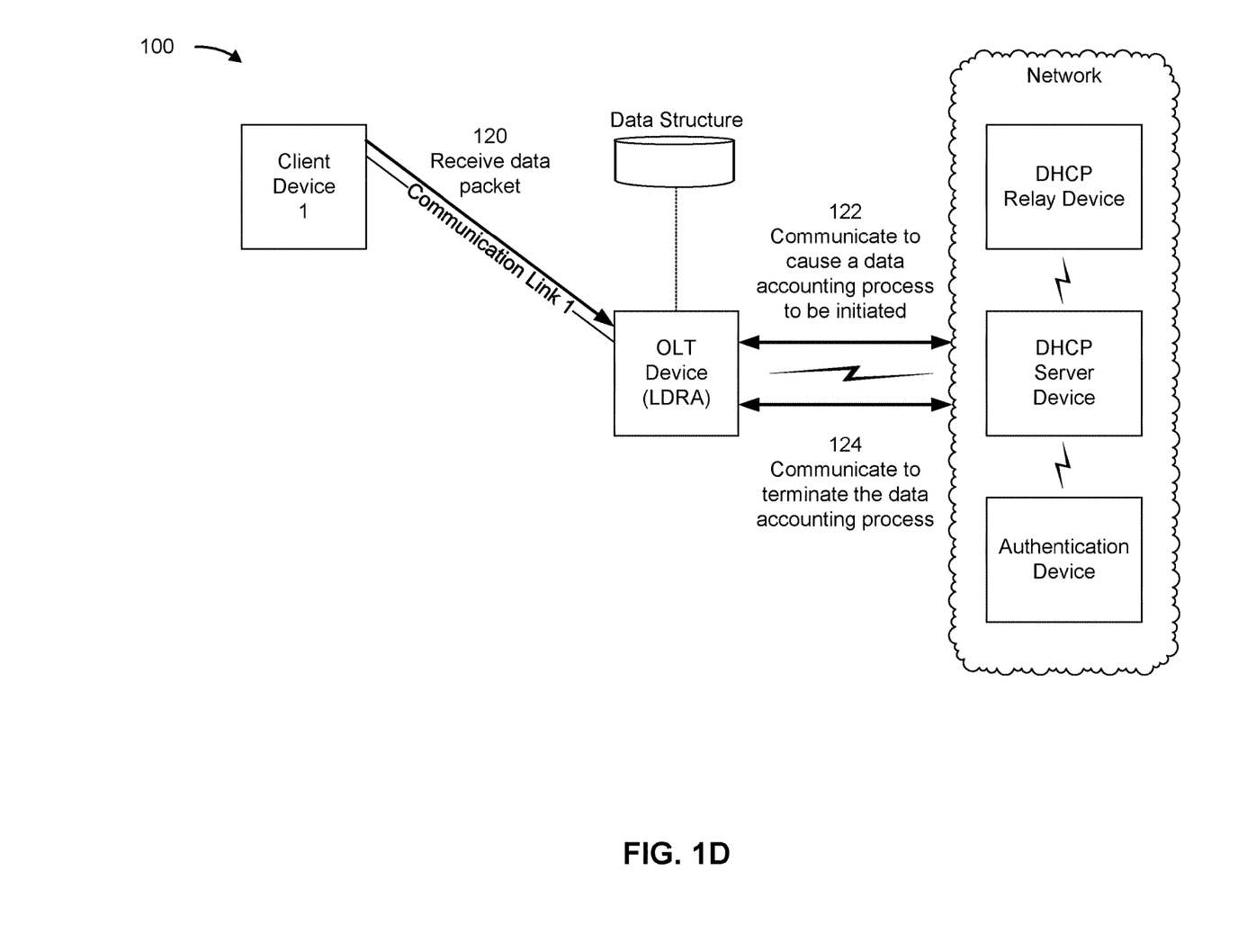

As shown by FIG. 1D, and by reference number 120, the OLT device may receive a data packet from a client device (shown as the client device 1) (e.g., after the OLT device obtained an IP address for the client device and provided the IP address to the client device). For example, the client device may send a data packet, via the communication link, to the OLT device, and therefore the OLT device may receive the data packet from the client device.

As shown by reference number 122, the OLT device may communicate with another device (e.g., the DHCP relay device, or another device) to cause a data accounting process to be initiated for the client device. For example, the OLT device, based on receiving the data packet, may send an initiation message to another device to cause the other device to initiate the data accounting process. As another example, the OLT device may forward the data packet to the other device, and the other device, based on receiving the data packet, then may initiate the data accounting process. The data accounting process may indicate an amount of data (e.g., a number of data packets, a size of the data packets, and/or other accounting information) that is communicated by the client device in association with the IP address over a period of time (e.g., a quantity of hours, days, weeks, or another period of time).

As shown by reference number 124, the OLT device may communicate with another device (e.g., the DHCP relay device, or another device) to cause the data accounting process to be terminated for the client device (e.g., after causing the data accounting process to be initiated). For example, the OLT device, may determine an amount of time since the OLT device has ceased receiving at least one additional data packet from the client device. The OLT device may therefore determine whether the amount of time satisfies (e.g., is greater than or equal to) a threshold (e.g., an amount of time threshold). When the OLT device determines that the amount of time satisfies the threshold, which may indicate that the client device has likely ceased communicating data packets in association with the IP address associated with the client device, the OLT device may cause the data accounting process to be terminated. For example, the OLT device may send a termination message to the other device (e.g., the DHCP relay device, or another device) to cause the other device to terminate the data accounting process. Alternatively, the DHCP relay device, or the other device, may determine that the amount of time satisfies the threshold and may therefore terminate the data accounting process (e.g., without communicating with the OLT device).

As indicated above, FIGS. 1A-1F are provided as an example. Other examples may differ from what is described with regard to FIGS. 1A-1F.

Figure 2:
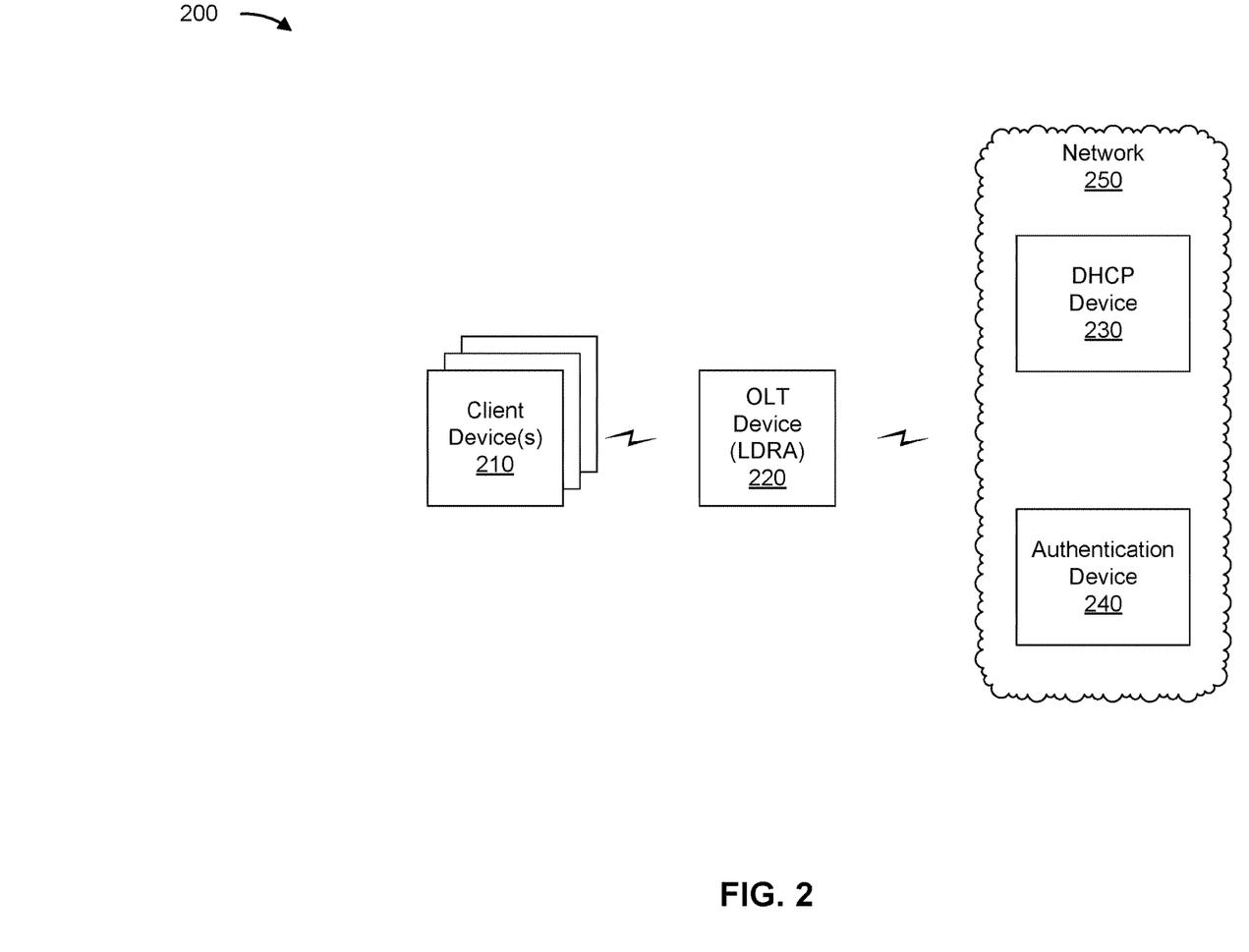
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210, an OLT device 220, a DHCP device 230, an authentication device 240, and a network 250. Devices of environment 200 may interconnect via wired connections, wireless connections, or a combination of wired and wireless connections.

The client device 210 includes one or more devices capable of receiving, generating, storing, processing, and/or providing information, such as information described herein. For example, the client device 210 may include a device that is configured to optically communicate with another optical device, such as the OLT device 220. In some implementations, the client device 210 may be able to convert optical signals into electrical signals, and vice versa, to allow a user device (e.g., laptop computer, a tablet computer, a desktop computer, or another type of device) to communicate with the other optical device (e.g., via the client device 210). In some implementations, the client device 210 may communicate with the OLT device (by communicating one or more DHCP packets) in association with requesting an IP address (e.g., for the client device 210). In some implementations, the client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The OLT device 220 includes one or more devices capable of receiving, processing, storing, routing, and/or providing information, such as information described herein. For example, the OLT device 220 may include a router, such as a label switching router (LSR), a label edge router (LER), an ingress router, an egress router, a provider router (e.g., a provider edge router or a provider core router), a virtual router, or another type of router. Additionally, or alternatively, the OLT device 220 may include a gateway, a switch, a firewall, a hub, a bridge, a reverse proxy, a server (e.g., a proxy server, a cloud server, or a data center server), a load balancer, and/or a similar device. In some implementations, the OLT device may include a device that is configured to optically communicate with another optical device, such as the client device 210. In some implementations, the OLT device 220 may be able to convert optical signals into electrical signals, and vice versa. In some implementations, the OLT device 220 may be a physical device implemented within a housing, such as a chassis. In some implementations, the OLT device 220 may be configured as an LDRA and/or may communicate with the client device 210, the DHCP device 230, and/or the authentication device 240 (by communicating one or more DHCP packets) in association with requesting network an IP address (e.g., for the client device 210).

The DHCP device 230 includes one or more devices capable of receiving, processing, storing, routing, and/or providing information, as described elsewhere herein. The DHCP device 230 may include a router, such as a label switching router (LSR), a label edge router (LER), an ingress router, an egress router, a provider router (e.g., a provider edge router or a provider core router), a virtual router, or another type of router. Additionally, or alternatively, the DHCP device 230 may include a gateway, a switch, a firewall, a hub, a bridge, a reverse proxy, a server (e.g., a proxy server, a cloud server, or a data center server), a load balancer, and/or a similar device. In some implementations, the DHCP device 230 may be a physical device implemented within a housing, such as a chassis. In some implementations, the DHCP device 230 may a DHCP relay device or a DHCP server device. Accordingly, the DHCP device 230 may be configured to facilitate reserving an IP address for the client device 210, such as by communicating with the OLT device 220.

The authentication device 240 may include one or more devices capable of receiving, generating, storing, processing, providing, such as information described herein. The authentication device 240 may include a communication device and/or a computing device. For example, the authentication device 240 may include a server, such as an authentication server, an application server, a client server, a web server, a database server, a host server, a proxy server, a virtual server (e.g., executing on computing hardware), or a server in a cloud computing system. In some implementations, the authentication device 240 may include computing hardware used in a cloud computing environment.

Network 250 includes one or more wired and/or wireless networks. For example, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. The network 250 may be associated with a BNG.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
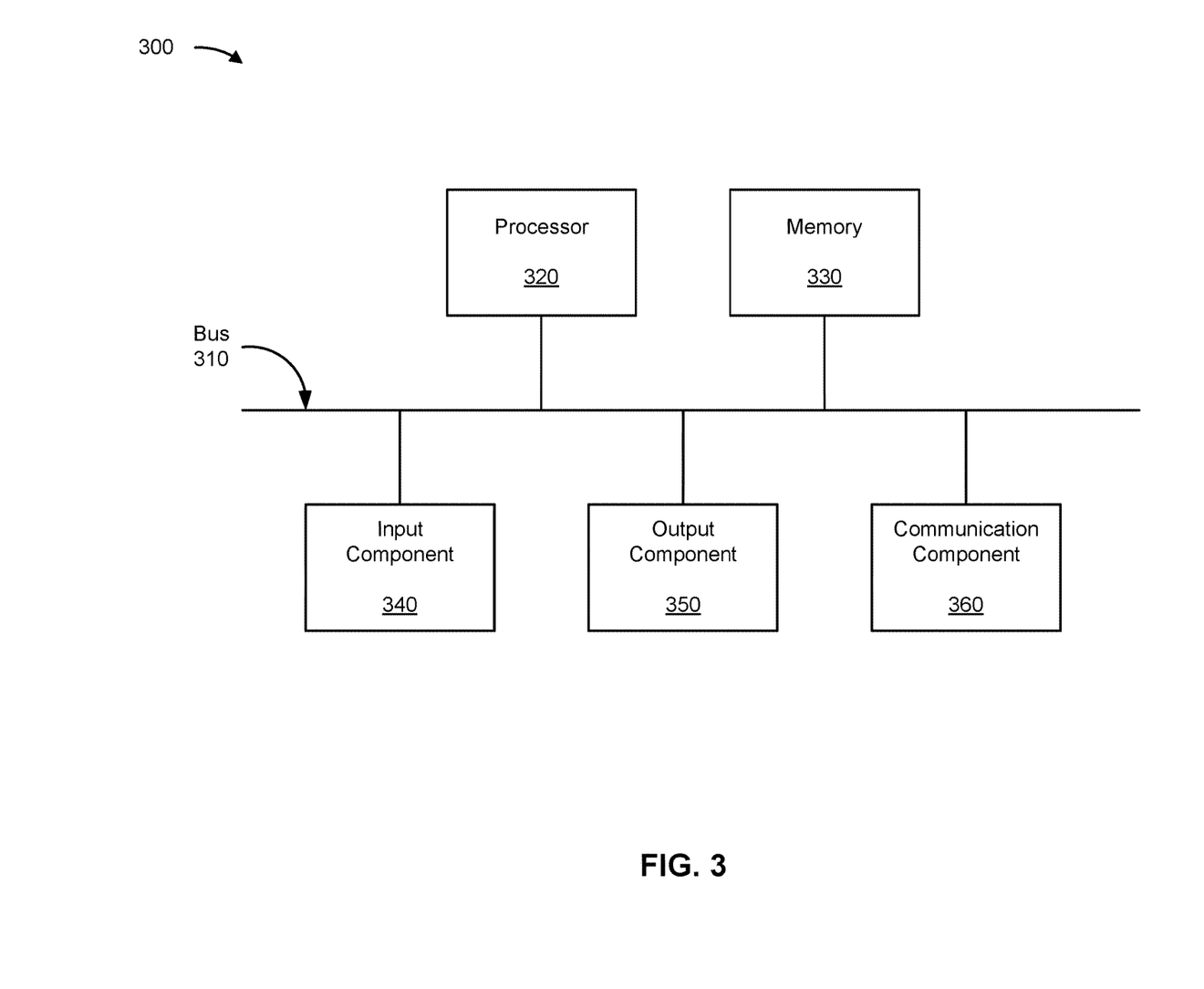
FIG. 3 is a diagram of example components of a device.

FIG. 3 is a diagram of example components of a device 300, which may correspond to the client device 210, the OLT device 220, the DHCP device 230, and/or the authentication device 240. In some implementations, the client device 210, the OLT device 220, the DHCP device 230, and/or the authentication device 240 includes one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
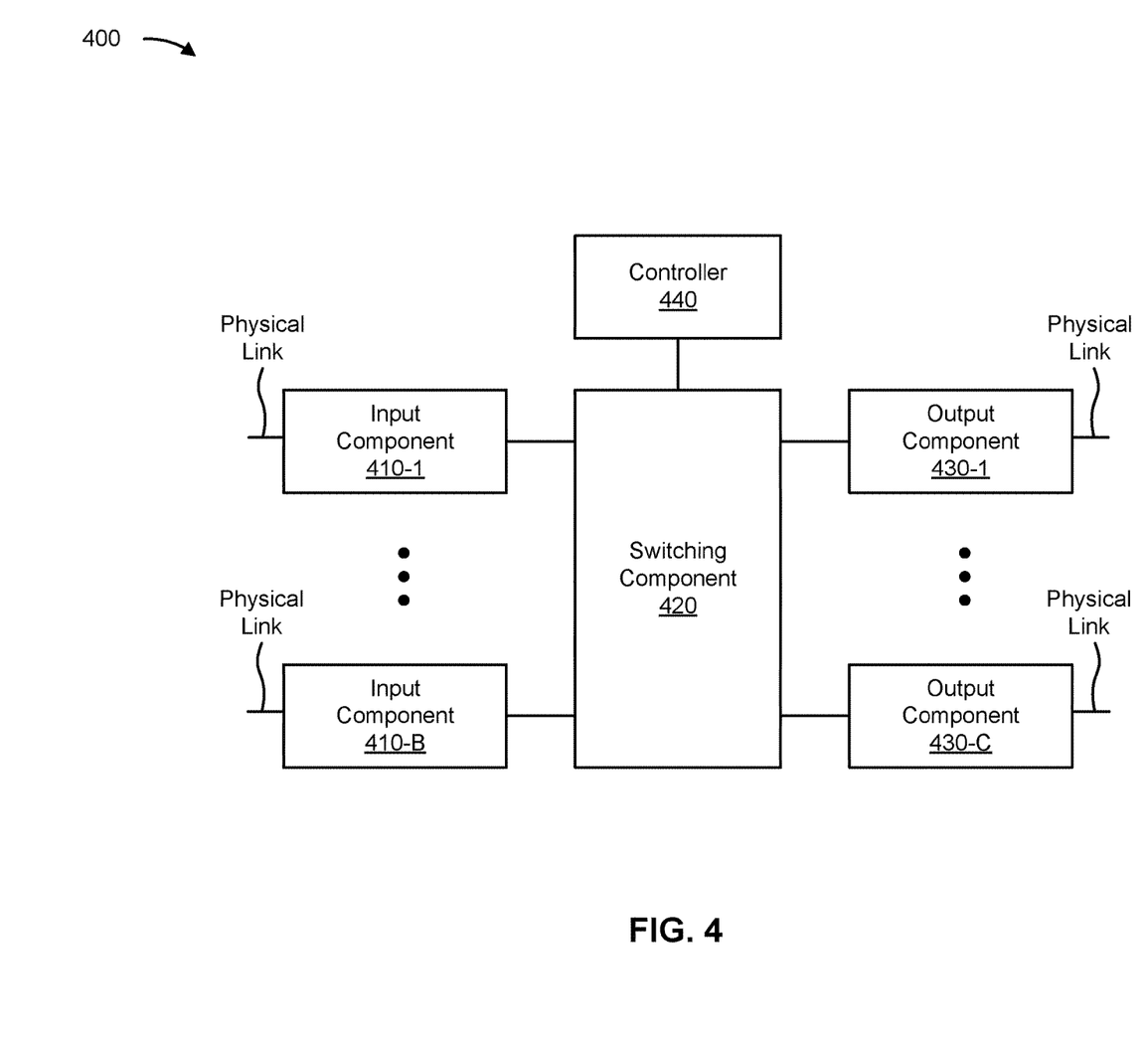
FIG. 4 is a diagram of example components of a device.

FIG. 4 is a diagram of example components of a device 400. Device 400 may correspond to the client device 210, the OLT device 220, the DHCP device 230, and/or the authentication device 240. In some implementations, the client device 210, the OLT device 220, the DHCP device 230, and/or the authentication device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
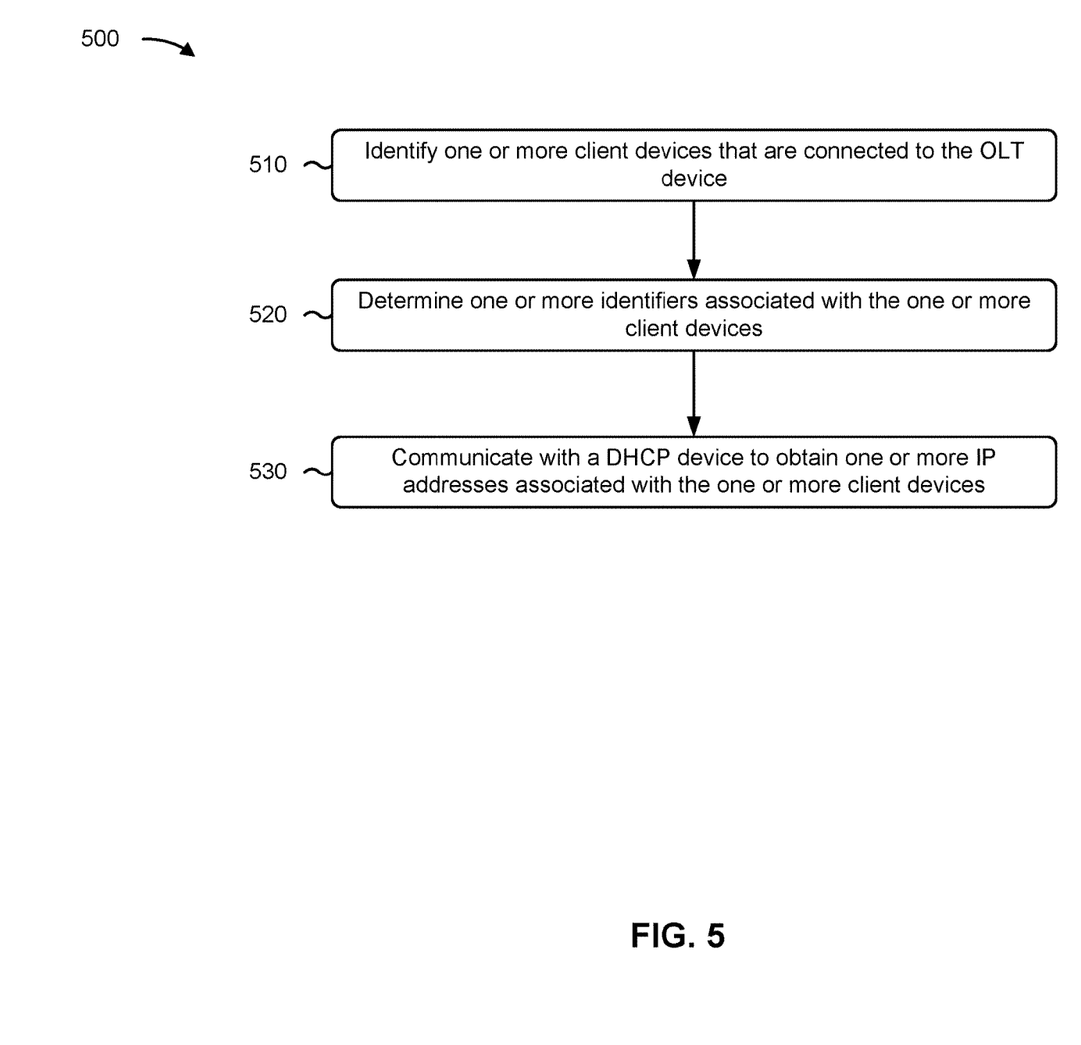
FIG. 5 is a flowchart of an example process associated with optimized DHCP communication for an OLT device.

FIG. 5 is a flowchart of an example process 500 associated with optimized DHCP communication for an OLT device. In some implementations, one or more process blocks of FIG. 5 are performed by an OLT device (e.g., the OLT device 220). In some implementations, one or more process blocks of FIG. 5 are performed by another device or a group of devices separate from or including the OLT device, such as a client device (e.g., the client device 210) a DHCP device (e.g., the DHCP device 230) and/or an authentication device (e.g., the authentication device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include identifying one or more client devices that are connected to the OLT device (block 510). For example, the OLT device may identify one or more client devices that are connected to the OLT device, such as via one or more communication links, as described above.

As further shown in FIG. 5, process 500 may include determining one or more identifiers associated with the one or more client devices (block 520). For example, the OLT device may determine, based on identifying the one or more client devices, one or more identifiers associated with the one or more client devices, as described above.

As further shown in FIG. 5, process 500 may include communicating with a DHCP device to obtain one or more IP addresses associated with the one or more client devices (block 530). For example, the OLT device may communicate, based on determining the one or more identifiers associated with the one or more client devices, with a DHCP relay device to obtain one or more IP addresses associated with the one or more client devices, as described above.

Process 500 may include additional implementations, such as any single implementation or any combination of implementations described below and/or in connection with one or more other processes described elsewhere herein.

In a first implementation, a particular identifier, of the one or more identifiers, is associated with a particular client device, of the one or more client devices, which is connected to the OLT device via a particular communication link of the one or more communication links, and the particular identifier is a circuit identifier associated with the particular communication link.

In a second implementation, alone or in combination with the first implementation, communicating with the DHCP device comprises generating a DHCP message that includes a particular identifier, of the one or more identifiers, that is associated with a particular client device, of the one or more client devices, sending the DHCP message to the DHCP device, and receiving, based on sending the DHCP message, another DHCP message that includes the particular identifier and a particular IP address, of the one or more IP addresses, associated with the particular client device.

In a third implementation, alone or in combination with one or more of the first and second implementations, process 500 includes communicating, after communicating with the DHCP device to obtain the one or more IP addresses, with the DHCP device to renew at least one IP address of the one or more IP addresses.

In a fourth implementation, alone or in combination with one or more of the first through third implementations, process 500 includes storing, in a data structure, the one or more IP addresses associated with the one or more client devices in association with the one or more identifiers associated with the one or more client devices.

In a fifth implementation, alone or in combination with one or more of the first through fourth implementations, process 500 includes receiving, after communicating with the DHCP device, a DHCP message from a particular client device, of the one or more client devices, and via a particular communication link, of the one or more communication links, that is associated with the particular client device, identifying, based on receiving the DHCP message, a particular identifier, of the one or more identifiers, that is associated with the particular client device, searching, based on the particular identifier, a data structure to identify a particular IP address, of the one or more IP addresses, that is associated with the particular client device, and sending, to the particular client device, another DHCP message that includes the particular IP address.

In a sixth implementation, alone or in combination with one or more of the first through fifth implementations, process 500 includes receiving, after communicating with the DHCP device, a data packet from a particular client device, of the one or more client devices, that is associated with a particular IP address of the one or more IP addresses, and causing, based on receiving the data packet, a data accounting process to be initiated for the particular client device.

In a seventh implementation, alone or in combination with one or more of the first through sixth implementations, process 500 includes determining, after causing the data accounting process to be initiated for the particular client device, an amount of time since the OLT device has ceased receiving at least one additional data packet from the particular client device, determining that the amount of time satisfies a threshold, and causing, based on determining that the amount of time satisfies the threshold, the data accounting process to be terminated.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by an optical line terminal (OLT) device, one or more client devices that are connected to the OLT device via one or more communication links;
   determining, by the OLT device and based on identifying the one or more client devices, one or more identifiers associated with the one or more client devices;
   communicating, by the OLT device and based on determining the one or more identifiers associated with the one or more client devices, with a dynamic host configuration protocol (DHCP) relay device to obtain one or more Internet protocol (IP) addresses associated with the one or more client devices;
   receiving, after communicating with the DHCP relay device, a data packet from a particular client device, of the one or more client devices, that is associated with a particular IP address of the one or more IP addresses; and
   causing, based on receiving the data packet, a data accounting process to be initiated for the particular client device.

2. The method of claim 1,
   wherein a particular identifier, of the one or more identifiers, is associated with a particular client device, of the one or more client devices, which is connected to the OLT device via a particular communication link of the one or more communication links, and
   wherein the particular identifier is a circuit identifier associated with the particular communication link.

3. The method of claim 1,
   wherein communicating with the DHCP relay device comprises:
      generating a DHCP message that includes a particular identifier, of the one or more identifiers, that is associated with a particular client device, of the one or more client devices;
      sending the DHCP message to the DHCP relay device; and
      receiving, based on sending the DHCP message, another DHCP message that includes the particular identifier and a particular IP address, of the one or more IP addresses, associated with the particular client device.

4. The method of claim 1, further comprising:
   communicating, after communicating with the DHCP relay device to obtain the one or more IP addresses, with the DHCP relay device to renew at least one IP address of the one or more IP addresses.

5. The method of claim 1, further comprising:
   storing, in a data structure, the one or more IP addresses associated with the one or more client devices in association with the one or more identifiers associated with the one or more client devices.

6. The method of claim 1, further comprising:
   receiving, after communicating with the DHCP relay device, a DHCP message from a particular client device, of the one or more client devices, and via a particular communication link, of the one or more communication links, that is associated with the particular client device;
   identifying, based on receiving the DHCP message, a particular identifier, of the one or more identifiers, that is associated with the particular client device;

searching, based on the particular identifier, a data structure to identify a particular IP address, of the one or more IP addresses, that is associated with the particular client device; and sending, to the particular client device, another DHCP message that includes the particular IP address.

7. The method of claim 1, further comprising:

determining, after causing the data accounting process to be initiated for the particular client device, an amount of time since the OLT device has ceased receiving at least one additional data packet from the particular client device;

determining that the amount of time satisfies a threshold; and causing, based on determining that the amount of time satisfies the threshold, the data accounting process to be terminated.

8. A non-transitory computer-readable medium storing a set of instructions, the set of instructions comprising:

one or more instructions that, when executed by one or more processors of an optical line terminal (OLT) device, cause the OLT device to:

identify one or more client devices that are connected to the OLT device;

determine, based on identifying the one or more client devices, one or more identifiers associated with the one or more client devices;

communicate, based on the one or more identifiers, with a dynamic host configuration protocol (DHCP) device to obtain one or more Internet protocol (IP) addresses associated with the one or more client devices;

receive, after communicating with the DHCP device, a data packet from a particular client device, of the one or more client devices, that is associated with a particular IP address of the one or more IP addresses; and cause, based on receiving the data packet, a data accounting process to be initiated for the particular client device.

9. The non-transitory computer-readable medium of claim 8, wherein a particular identifier, of the one or more identifiers, is associated with a particular client device, of the one or more client devices, and wherein the particular identifier is a circuit identifier associated with a particular communication link that connects particular client device to the OLT device.

10. The non-transitory computer-readable medium of claim 8, wherein the one or more instructions, that cause the OLT device to communicate with the DHCP device comprises, cause the OLT device to:

send, to the DHCP device, a DHCP message that includes a particular identifier, of the one or more identifiers, that is associated with a particular client device, of the one or more client devices; and receive, based on sending the DHCP message, another DHCP message that includes the particular identifier and a particular IP address, of the one or more IP addresses, associated with the particular client device.

11. The non-transitory computer-readable medium of claim 8, wherein the one or more instructions further cause the OLT device to:

communicate, after communicating with the DHCP device to obtain the one or more IP addresses, with the DHCP device to renew at least one IP address of the one or more IP addresses.

12. The non-transitory computer-readable medium of claim 8, wherein the one or more instructions further cause the OLT device to:

store, in a data structure, the one or more IP addresses associated with the one or more client devices in association with the one or more identifiers.

13. The non-transitory computer-readable medium of claim 8, wherein the one or more instructions further cause the OLT device to:

receive, after communicating with the DHCP device, a DHCP message from a particular client device of the one or more client devices;

identify, based on the DHCP message, a particular identifier, of the one or more identifiers, that is associated with the particular client device;

search, based on the particular identifier, a data structure to identify a particular IP address, of the one or more IP addresses, that is associated with the particular client device; and send, to the particular client device, another DHCP message that includes the particular IP address.

14. The non-transitory computer-readable medium of claim 8, wherein the one or more instructions further cause the OLT device to:

determine, after causing the data accounting process to be initiated for the particular client device, an amount of time since the OLT device has ceased receiving at least one additional data packet from the particular client device;

determine that the amount of time satisfies a threshold; and cause, based on determining that the amount of time satisfies the threshold, the data accounting process to be terminated.

15. An optical line terminal (OLT) device, comprising:

one or more memories; and one or more processors configured to:

identify a client device that is connected to the OLT device;

determine an identifier associated with the client device;

communicate, based on the identifier, with a dynamic host configuration protocol (DHCP) device to obtain an Internet protocol (IP) address associated with the client device;

receive, after communicating with the DHCP device, a data packet from the client device that is associated with the IP address; and cause, based on receiving the data packet, a data accounting process to be initiated for the client device.

16. The OLT device of claim 15, wherein the identifier is a circuit identifier associated with a communication link that connects the client device to the OLT device.

17. The OLT device of claim 15, wherein the one or more processors, to communicate with the DHCP device, are further configured to:

send a DHCP message to the DHCP device that includes the identifier; and receive, based on sending the DHCP message, another DHCP message that includes the IP address.

18. The OLT device of claim 15, wherein the one or more processors are further configured to:
    receive, after communicating with the DHCP device, a DHCP message from the client device;
    identify, based on receiving the DHCP message, the identifier;
    identify, based on the identifier, the IP address; and
    send, to the client device, another DHCP message that includes the IP address.

19. The OLT device of claim 15, wherein the one or more processors are further configured to:
    store, in a data structure, the IP addresses associated with the client device in association with the one or more identifiers associated with the client device.

20. The OLT device of claim 15, wherein the one or more processors are further configured to:
    determine, after causing the data accounting process to be initiated for the client device, an amount of time since the OLT device has ceased receiving at least one additional data packet from the client device;
    determine that the amount of time satisfies a threshold; and
    cause, based on determining that the amount of time satisfies the threshold, the data accounting process to be terminated.

* * * * *